(12) United States Patent
Zhang et al.

(10) Patent No.: US 12,123,349 B2
(45) Date of Patent: Oct. 22, 2024

(54) INTERNAL-PARALLEL INLET WITH MODE CONVERSION COMBINED WITH VARIABLE GEOMETRY ADJUSTMENT

(71) Applicant: NANJING UNIVERSITY OF AERONAUTICS AND ASTRONAUTICS, Jiangsu (CN)

(72) Inventors: Yue Zhang, Jiangsu (CN); Huijun Tan, Jiangsu (CN); Chao Wang, Jiangsu (CN); Chao Li, Jiangsu (CN); Liang Chen, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 374 days.

(21) Appl. No.: 17/784,671

(22) PCT Filed: Aug. 26, 2020

(86) PCT No.: PCT/CN2020/111322
§ 371 (c)(1),
(2) Date: Jun. 13, 2022

(87) PCT Pub. No.: WO2021/143141
PCT Pub. Date: Jul. 22, 2021

(65) Prior Publication Data
US 2023/0010124 A1    Jan. 12, 2023

(30) Foreign Application Priority Data
Jan. 13, 2020  (CN) .......................... 202010030230.8

(51) Int. Cl.
*B64D 33/02* (2006.01)
*F02C 7/042* (2006.01)
*F02C 7/057* (2006.01)

(52) U.S. Cl.
CPC .............. *F02C 7/042* (2013.01); *B64D 33/02* (2013.01); *F02C 7/057* (2013.01); *B64D 2033/026* (2013.01); *Y10T 137/0536* (2015.04)

(58) Field of Classification Search
CPC ... F02C 7/042; B64D 33/02; B64D 2033/026; F02K 7/16; F02K 7/18; F02K 1/15; Y10T 137/0536
See application file for complete search history.

(56) References Cited

U.S. PATENT DOCUMENTS 3,915,413 A * 10/1975 Sargisson ................ F02C 7/042
                                                    137/15.2
4,641,678 A *  2/1987 Haas ...................... B64D 33/02
                                                    137/15.1
(Continued)

FOREIGN PATENT DOCUMENTS

CN    102705081    10/2012
CN    103950543    7/2014
(Continued)

OTHER PUBLICATIONS

"International Search Report (Form PCT/ISA/210) of PCT/CN2020/111322", mailed on Nov. 30, 2020, with English translation thereof, pp. 1-6.

*Primary Examiner* — Justin D Seabe
(74) *Attorney, Agent, or Firm* — JCIPRNET

(57) ABSTRACT

The present invention discloses an internal-parallel inlet with mode conversion combined with variable geometry adjustment, which comprises a high-speed channel, a low-speed channel, a mode conversion component, a variable geometry component and a motor actuating component. When the inlet is in a low-speed mode, the variable geometry component adjusts the throat area and the internal contraction ratio of the inlet. When the flight Mach number is in a range of the mode conversion Mach number, the mode (Continued)

conversion component and the variable geometry component work simultaneously. When the inlet is in a high-speed mode, the mode conversion component is combined with the variable geometry component to adjust the throat area and the internal contraction ratio of the inlet. The present invention also provides a method for controlling the inlet.

14 Claims, 1 Drawing Sheet

(56) References Cited

U.S. PATENT DOCUMENTS

| | | | | |
|---|---|---|---|---|
| 5,116,251 | A | * | 5/1992 | Bichler .................. B64D 33/02 60/768 |
| 11,542,867 | B2 | * | 1/2023 | Tan ......................... F02C 7/057 |
| 2007/0181743 | A1 | | 8/2007 | Klinge et al. |

FOREIGN PATENT DOCUMENTS

| | | | | |
|---|---|---|---|---|
| CN | 104863715 | | 8/2015 | |
| CN | 104890887 | | 9/2015 | |
| CN | 107298180 | | 10/2017 | |
| CN | 107448296 | | 12/2017 | |
| CN | 108412619 A | * | 8/2018 | ................ F02C 7/00 |
| CN | 109915263 | | 6/2019 | |
| CN | 111255569 | | 6/2020 | |

* cited by examiner

INTERNAL-PARALLEL INLET WITH MODE CONVERSION COMBINED WITH VARIABLE GEOMETRY ADJUSTMENT

CROSS-REFERENCE TO RELATED APPLICATION

This application is a 371 of international application of PCT application serial no. PCT/CN2020/111322, filed on Aug. 26, 2020, which claims the priority benefit of China application no. 202010030230.8, filed on Jan. 13, 2020. The entirety of each of the above-mentioned patent applications is hereby incorporated by reference herein and made a part of this specification.

BACKGROUND

Technical Field

The present disclosure relates to the field of aircraft design, and particularly to a combined engine inlet.

Description of Related Art

The air-breathing combined engine has a plurality of advantages such as wide working range, high reliability, reuse, capable of horizontal take-off and landing and high specific impulse, and is an ideal power device for the hypersonic aircraft. The inlet, served as an important component of a propulsion system of the air-breathing combined engine, not only efficiently provides air with certain pressure, temperature and flow for the engine within a wide Mach number range, but also has the functions of working mode conversion, outlet flow field uniformity adjustment, upstream and downstream disturbance isolation and the like. For this reason, the working performance of such an inlet within the wide Mach number range is one of the key technologies for developing air-breathing combined engines.

Turbine-Based Combined-Cycle (TBCC) inlet is the most common combined engine inlet, and is composed of two inlet ducts corresponding to a turbine working mode and a ram working mode of the engine. Due to the considerations of convenience in design, simple structure, easiness in implementing mode conversion and the like, designers mostly apply a binary inlet to the TBCC engine. Due to different layout modes and relative positions of the turbine module and the ram module, the binary TBCC inlet can be classified into a parallel inlet and a serial inlet, wherein the parallel inlet can be further classified into an external-parallel inlet and an internal-parallel inlet. Since an inner channel molded surface of the binary TBCC inlet is formed by simply stretching a two-dimensional plane curve along a span direction, when implementing the mode conversion of the engine, it is only necessary to arrange a binary flow distribution plate at the forebody of the inlet or inside the inlet to make it rotate on a fixed axis with the span direction as the axis, so that the binary flow distribution plate can play a role of a mode selection valve, and the switching of inlet ducts and the conversion of engine working modes are achieved.

The TBCC inlet provides stable and good air flow to the engine in a very wide flight range and variable flight conditions, which requires the inlet to adopt some effective adjustment methods to adapt to the change of the flight state in the whole flight process. The conventional TBCC inlet adjusting method adopts a variable geometry adjusting mode, including cowl rotation/retraction, inclined plate adjustment, central cone translation and a composite mechanical variable geometry method, and can adjust the wave system and the contraction ratio of the opening of the inlet, thereby effectively improving the performance of the inlet. The above variable geometry adjusting mode generally requires a set of separate adjustment components to control the inlet based on different flight conditions. The mode conversion process also requires a set of actuating mechanisms to control the mode conversion. Therefore, two sets of actuating mechanisms are required, which will not only obviously increase the weight of the actuating mechanism, the complexity of the actuating mechanism and the control difficulty of the actuating mechanism, but also result in the problems of thermal protection, sealing difficulty and the like.

SUMMARY

Objective: in order to solve the above problems, the present disclosure provides an internal-parallel inlet with mode conversion combined with variable geometry adjustment, which uses a set of actuating mechanisms to simultaneously control the variable geometry adjustment process and the mode conversion process, thereby reducing the weight of the actuating mechanism. Due to the simplification of the actuating mechanism, the control difficulty of the actuating mechanism is also reduced. The starting capability of the combined engine inlet at low Mach number and the compression performance thereof at high Mach number can be improved, and the mass flow coefficient and the working performance of the inlet can be remarkably improved in a wide Mach number range.

The present disclosure also provides a method for controlling the internal-parallel inlet.

For the above purposes, the present disclosure adopts the following technical scheme:

an internal-parallel inlet with mode conversion combined with variable geometry adjustment comprises a high-speed channel extending from front to back, a low-speed channel positioned at an inner side of the high-speed channel and extending from front to back in parallel with the high-speed channel, a forebody compression surface, and a flow distribution plate of the high-speed/low-speed channel positioned between the high-speed channel and the low-speed channel; wherein the flow distribution plate comprises a fixed plate and a movable plate hinged to a front end of the fixed plate, and the movable plate swings inwards or outwards from a hinged position of the movable plate with the fixed plate; an outer wall surface of the high-speed channel is a high-speed channel cowl; an inner wall surface of the low-speed channel comprises a lower integrated surface hinged to a rear end of the forebody compression surface and a flexible diffusion section connected with a rear end of the lower integrated surface and extending backwards; a base is arranged on the inner sides of the forebody compression surface, the lower integrated surface and the flexible diffusion section; the base is provided with a driving device, a driving block connected with the driving device and a sliding rail bearing the driving block, and the driving block moves back and forth along the sliding rail under the driving of the driving device; a first driving rod positioned between an inner side of the lower integrated surface and the driving block and a second driving rod positioned between an inner side of the movable plate and the driving block are also arranged; a first guide groove and a second guide groove positioned behind the first guide groove are formed inside the driving block; the first guide groove comprises a first front end, a first middle position and a first rear end, the first front end is lower than the first middle position and the first rear end, the first middle position is lower than the first rear end, the second guide groove comprises a second front end, a second middle position and a second rear end, the second front end is higher than the second middle position and the second rear end, and the second rear end is higher than the second middle position;

one end of the first driving rod is fixed with the lower integrated surface, while a lower end of the first driving rod is hinged with the first guide groove through a first transverse shaft positioned in the first guide groove, and one end of the second driving rod is hinged with the movable plate, while a lower end of the second driving rod is hinged with the second guide groove through a second transverse shaft positioned in the second guide groove;

when one end of the first driving rod is positioned at the first front end, one end of the second driving rod is positioned at the second front end, and a front end of the movable plate abuts against an inner side of the high-speed channel cowl;

when the driving block moves forwards until one end of the first driving rod is positioned at the first middle position, one end of the second driving rod is positioned at the second middle position, the lower integrated surface is close to the high-speed channel cowl, and the front end of the movable plate abuts against an outer side of the flexible diffusion section;

when the driving block moves forwards until one end of the first driving rod is positioned at the first rear end, one end of the second driving rod is positioned at the second rear end, and the front end of the movable plate abuts against the outer side of the flexible diffusion section.

Further, the second front end of the second guide groove extends from front to back for a certain distance, and when one end of the second driving rod slides within the distance of the second front end, the front end of the movable plate always abuts against the inner side of the high-speed channel cowl.

Further, a rear end of the base is provided with a guide rail, a rear end of the flexible diffusion section is provided with a guide block matched with the guide rail, and the guide block slides back and forth on the guide rail.

Further, the second driving rod passes through the flexible diffusion section and is transversally positioned under the constraint of the flexible diffusion section.

Further, a bottom of the driving block is provided with a plurality of sliding blocks matched with the sliding rail.

Further, a front end of the lower integrated surface is positioned in front of the high-speed channel cowl and is connected with the forebody compression surface, the lower integrated surface comprising a secondary external compression surface, an internal pressure section and a throat section sequentially extending from front to back.

Further, a first pulley rolling along the first guide groove is arranged in the first guide groove, and one end of the first driving rod is hinged with the first pulley; a second pulley rolling along the second guide groove is arranged in the second guide groove, and one end of the second driving rod is hinged with the second pulley.

Beneficial effects: the internal-parallel inlet with mode conversion combined with variable geometry adjustment provided by the present disclosure achieves mode conversion and variable geometry adjustment of the inlet at the same time by adopting a set of actuating mechanisms. The inlet can adapt to a wider flight speed domain, has the aerodynamic performance of the inlet in high and low-speeds, ensures that a combined engine can effectively work in a wider flight envelope line, and has such advantages as light weight of the actuating mechanism, small control difficulty of the actuating mechanism and compact layout.

The method for controlling the internal-parallel inlet adopts the following technical scheme:

a working Mach number of the inlet is in a range of 0-6, and a Mach number of mode conversion is Mt ($2.5<Mt<3$); a working Mach number under a low-speed mode is in a range of 0-Mt, a working Mach number under a high-speed mode is in a range of Mt-6, and a Mach number of variable geometry adjustment under the low-speed mode is in a range of M1-Mt ($1.5<M1<2.5$); the specific working steps are as follows:

(1) when a flight Mach number is $0<M\infty<Mt$, and one end of the first driving rod is positioned at the first front end, one end of the second driving rod is positioned at the second front end, and the front end of the movable plate abuts against the inner side of the high-speed channel cowl; at the moment, the high-speed channel (1) is completely closed, the low-speed channel is opened, the throat area is the largest, and the internal contraction ratio is minimum; when $M1<M\infty<Mt$, the driving device drives the driving block to slide forwards, the front end of the movable plate abuts against the inner side of the high-speed channel cowl, and the flexible alloy material diffusion section moves towards the movable plate; at the moment, the high-speed channel is still completely closed, the low-speed channel is still opened, the total compression angle of external compression is continuously increased, the throat area is continuously reduced, and the internal contraction ratio is continuously increased until $M\infty=Mt$; at the moment, the total compression angle of external compression, the throat area and the internal contraction ratio meet the compression amount required by the maximum Mach number under the low-speed mode;

(2) when the flight Mach number is $M\infty>Mt$, the driving device drives the driving block to continuously slide forwards until one end of the first driving rod is positioned at the first middle position, one end of the second driving rod is positioned at the second middle position, and the front end of the movable plate is in contact with the flexible alloy material diffusion section; at the moment, the low-speed channel is completely closed, the high-speed channel is completely opened, and mode conversion is completed;

(3) when the flight Mach number is $Mt<M\infty<6$, the inlet works under the high-speed mode; the driving device drives the driving block to continuously slide forwards, one end of the first driving rod is positioned at the first rear end, one end of the second driving rod is positioned at the second rear end, the front end of the movable plate is in contact with the flexible alloy material diffusion section, the flexible alloy material diffusion section moves towards the high-speed channel cowl, at the moment, the total compression angle of external compression is continuously increased, the throat area is continuously reduced, and the internal contraction ratio is continuously increased, so that the compression performance of the inlet at high Mach number is ensured, and the mass flow coefficient of the inlet at high Mach number is improved; when M∞=6, the flexible alloy material diffusion section moves to a limit position close to the high-speed channel cowl, at the moment, the total compression angle of external compression is the largest, the throat area is the smallest, the internal contraction ratio is maximum, the inlet is in the shock-on-lip condition, and the mass flow coefficient is maximum.

DESCRIPTION OF THE EMBODIMENTS

Figure 1:
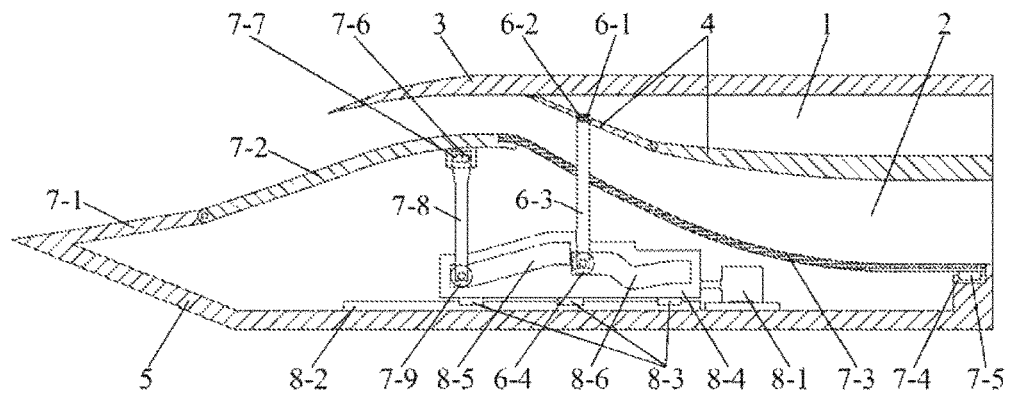
FIG. 1 is a schematic sectional view of the internal-parallel inlet with mode conversion combined with variable geometry adjustment according to the present disclosure, and shows the working state in a low-speed mode.
Figure 2:
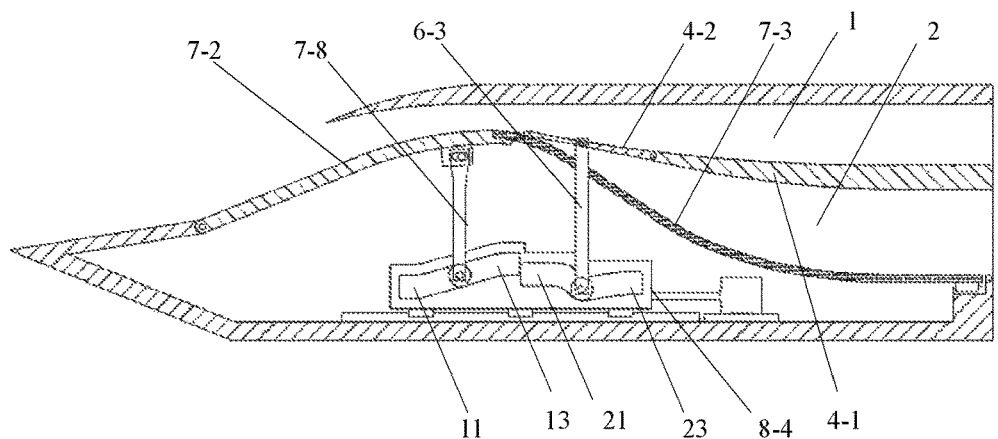
FIG. 2 is a diagram showing the working state of the internal-parallel inlet according to the present disclosure at the end of the mode conversion.
Figure 3:
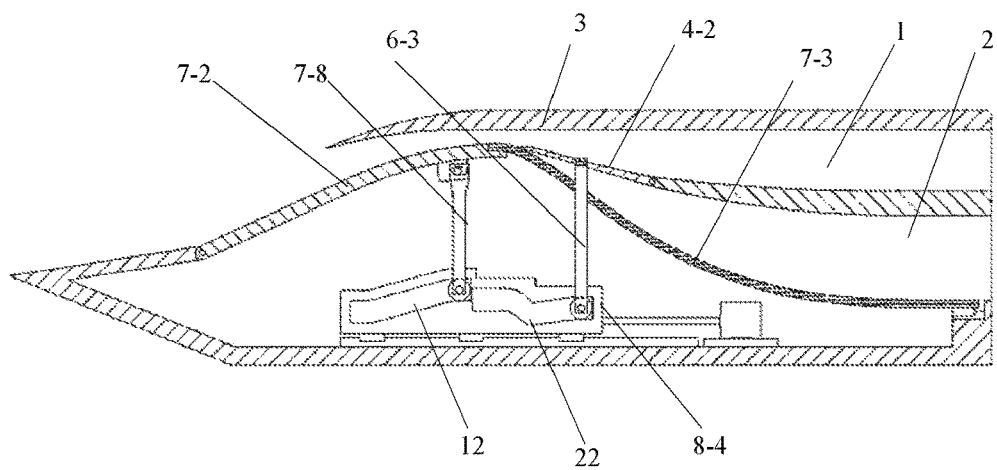
FIG. 3 is a diagram showing the working state of the internal-parallel inlet according to the present disclosure when the inlet is cruising at M6.

Referring to FIGS. 1-3, the present disclosure discloses an internal-parallel inlet with mode conversion combined with variable geometry adjustment, which comprises a high-speed channel 1 extending from front to back, a low-speed channel 2 positioned at an inner side of the high-speed channel and extending from front to back in parallel with the high-speed channel, a forebody compression surface 7-1, a flow distribution plate 4 of the high-speed/low-speed channel positioned between the high-speed channel and the low-speed channel, a mode conversion component 6, a variable geometry component 7 and a motor actuating component 8. The flow distribution plate 4 comprises a fixed plate 4-1 and a movable plate 4-2 hinged to a front end of the fixed plate, and the movable plate 4-2 swings inwards or outwards from a hinged position of the movable plate with the fixed plate 4-1. The mode conversion component 6 mainly comprises a driving rod 6-3 with a sliding groove 6-2 at one end and a roller 6-4. A pin 6-1 on the movable plate 4-2 passes through the sliding groove 6-2, and the roller 6-4 is connected with the driving rod 6-3. The driving rod 6-3 is driven to reciprocate by the up-and-down movement of the roller 6-4, the pin 6-1 on the flow distribution plate 4 moves up and down and slides left and right in the sliding groove 6-2 under the driving of the driving rod 6-3, and therefore the mode conversion is achieved. An outer wall surface of the high-speed channel 1 is a high-speed channel cowl 3; an inner wall surface of the low-speed channel 2 comprises a lower integrated surface 7-2 hinged to a rear end of the forebody compression surface 7-1 and a flexible diffusion section 7-3 connected with a rear end of the lower integrated surface and extending backwards; a base 5 is arranged on the inner sides of the forebody compression surface 7-1, the lower integrated surface 7-2 and the flexible diffusion section 7-3; the base is provided with a driving device 8-1, a driving block 8-4 connected with the driving device and a sliding rail 8-2 bearing the driving block, and the driving block moves back and forth along the sliding rail under the driving of the driving device; a first driving rod 7-8 positioned between an inner side of the lower integrated surface 7-2 and the driving block and a second driving rod 6-3 positioned between an inner side of the movable plate 4-2 and the driving block are also arranged; a first guide groove 8-5 and a second guide groove 8-6 positioned behind the first guide groove are formed inside the driving block; the first guide groove comprises a first front end 11, a first middle position 12 and a first rear end 13, the first front end 11 is lower than the first middle position 12 and the first rear end 13, and the first middle position 12 is lower than the first rear end 13. The second guide groove 8-6 comprises a second front end 21, a second middle position 22 and a second rear end 23, the second front end 21 is higher than the second middle position 22 and the second rear end 23, and the second rear end 23 is higher than the second middle position 22. A first pulley 7-9 rolling along the first guide groove 8-5 is arranged in the first guide groove 8-5, and one end of the first driving rod 7-8 is hinged with the first pulley 7-9. A second pulley 6-4 rolling along the second guide groove is arranged in the second guide groove, one end of the second driving rod 6-3 is hinged with the second pulley 6-4, one end of the first driving rod 7-8 is fixed with the lower integrated surface 7-2, and a lower end of the first driving rod is hinged with the first guide groove 8-5 through a first transverse shaft positioned in the first guide groove 8-5. One end of the second driving rod 6-3 is hinged with the movable plate 4-2, while a lower end of the second driving rod is hinged with the second guide groove 8-6 through a second transverse shaft positioned in the second guide groove 8-6. As shown in FIG. 1, when one end of the first driving rod 7-8 is positioned at the first front end 11, one end of the second driving rod 6-3 is positioned at the second front end 21, and a front end of the movable plate 4-2 abuts against an inner side of the high-speed channel cowl 3. As shown in FIG. 2, when the driving block 8-4 moves forwards until one end of the first driving rod 7-8 is positioned at the first middle position 12, one end of the second driving rod 6-3 is positioned at the second middle position 8-6. The lower integrated surface 7-2 is close to the high-speed channel cowl 3, and the front end of the movable plate 4-2 abuts against an outer side of the flexible diffusion section 7-3. As shown in FIG. 3, when the driving block 8-4 moves forwards until one end of the first driving rod 7-8 is positioned at the first rear end 13, one end of the second driving rod 6-3 is positioned at the second rear end 23, and the front end of the movable plate 4-2 abuts against the outer side of the flexible diffusion section 7-3. The second front end 21 extends from front to back for a certain distance, and when one end of the second driving rod 6-3 slides within the distance of the second front end 21, the front end of the movable plate 4-2 always abuts against the inner side of the high-speed channel cowl 3.

The inlet of the present disclosure comprises a high-speed channel 1, a low-speed channel 2, a cowl 3, a flow distribution plate 4 of the high-speed channel and the low-speed channel, a base 5, a mode conversion component 6, a variable geometry component 7 and a motor actuating component 8. The mode conversion component 6 mainly comprises the second driving rod 6-3 with a sliding groove 6-2 at one end and the roller 6-4. The pin 6-1 on the movable plate 4-2 passes through the sliding groove 6-2, and the roller 6-4 is connected with the second driving rod 6-3. The driving rod 6-3 is driven to reciprocate by the up-and-down movement of the roller 6-4, the pin 6-1 on the flow distribution plate 4 moves up and down and slides left and right in the sliding groove 6-2 under the driving of the second driving rod 6-3, and therefore the mode conversion is achieved. The variable geometry component 7 comprises a secondary external compression surface hinged with a primary external compression surface 7-1, an internal pressure section and a throat section integrated surface 7-2, a flexible alloy material diffusion section 7-3 directly fixedly connected with the integrated surface 7-2, a first driving rod 7-8 with a sliding groove 7-7, and a roller 7-9. The first driving rod 7-8 can only move up and down in the direction shown in FIG. 1 because one end of the first driving rod is fixed to the integration surface 7-2 (i.e., the first driving rod 7-8 is limited in the transverse direction and cannot swing transversely). The roller 7-9 is connected with the first driving rod 7-8, a pin 7-6 protruding from a lower portion of the integrated surface 7-2 passes through the sliding groove 7-7, the flexible alloy material diffusion section 7-3 is fixedly connected with a guide block 7-5, and the guide block 7-5 is connected with a guide rail 7-4 in a sliding mode. The first driving rod 7-8 is driven to reciprocate by the up-and-down movement of the roller 7-9, the pin 7-6 protruding from the lower portion of the integrated surface 7-2 moves up and down and slides left and right in the sliding groove 7-7 under the driving of the first driving rod 7-8, and meanwhile, the guide block 7-5 connected with the flexible alloy material diffusion section 7-3 slides left and right on the guide rail 7-4. This process adjusts the size of the total compression angle of external compression of the inlet, and simultaneously adjusts the throat area and the internal contraction ratio of the inlet. The motor actuating component 8 comprises a motor 8-1 and a sliding track 8-2 which are fixed on the base 5, a driving block 8-4 of a track 8-5 and a track 8-6 arranged inside the motor actuating component, and sliding blocks 8-3 fixedly connected with the driving block 8-4. The motor 8-1 is fixedly connected with the driving block 8-4, the sliding blocks 8-3 are slidably connected with the sliding track 8-2, and the roller 7-9 and the roller 6-4 pass through the track 8-5 and the track 8-6, respectively. When a screw of the motor 8-1 moves left and right, the sliding blocks 8-3 and the driving block 8-4 integrally move left and right, and meanwhile, the roller 7-9 and the roller 6-4 roll along the upper and lower wall surfaces of the track 8-5 and the track 8-6, respectively. Since the first driving rod 7-8 connected with the roller 7-9 and the second driving rod 6-3 connected with the roller 6-4 are restricted by the sliding groove 7-7 and a groove on the side wall of the inlet, respectively; the roller 7-9 and the roller 6-4 can move only up and down (i.e., inward or outward) in a vertical direction in the direction shown in FIG. 1. This process provides the power for the mode conversion process and the variable geometry process.

A working Mach number of the inlet is in a range of 0-6, and a Mach number of mode conversion is Mt (2.5<Mt<3); a working Mach number under a low-speed mode is in a range of 0-Mt, a working Mach number under a high-speed mode is in a range of Mt-6, and a Mach number of variable geometry adjustment under the low-speed mode is in a range of M1-Mt (1.5<M1<2.5). The specific working steps are as follows:

(1) when a flight Mach number is 0<M∞<Mt, the inlet works under the low-speed mode. In the low-speed mode, with the flight Mach number M∞ changes, the throat area and the internal contraction ratio required by the self-starting, deceleration and pressurization of the inlet are changed. When 0<M∞<M1, the motor 8-1 drives the driving block 8-4 to slide to a right limit position, and the pin 7-6, the pin 6-1 and the guide block 7-5 are all positioned at the right limit position; the roller 7-9 and the roller 6-4 are positioned at the leftmost limit positions of the track 8-5 and the track 8-6, respectively; the roller 7-9 is positioned at the lowest point, and the roller 6-4 is positioned at the highest point; the sharp point of the flow distribution plate 4 is in contact with the inner wall surface of the cowl 3. At the moment, the high-speed channel 1 is completely closed, the low-speed channel 2 is completely opened, the throat area is the largest, the internal contraction ratio is minimum, and the inlet obtains the optimal starting capability, as shown in FIG. 1. When M1<M∞<Mt, the motor 8-1 drives the driving block 8-4 to slide leftwards, at the moment, the roller 7-9 is continuously lifted and the height of the roller 6-4 is not changed, and therefore the integrated surface 7-2 rotates around a hinge in the counterclockwise direction, the flexible alloy material diffusion section 7-3 is driven to move upward to the right, and meanwhile the guide block 7-5 slides rightwards. At the time, the high-speed channel 1 is still completely closed, the low-speed channel 2 is still completely opened, the total compression angle of external compression is continuously increased, the throat area is continuously reduced, and the internal contraction ratio is continuously increased, so as to match the compression amount required by the deceleration and pressurization of the incoming flow. When M∞=Mt, the roller 6-4 slides to an intersection of a horizontal section and a descending section of the track 8-6, and at the moment, the total compression angle of external compression, the throat area and the internal contraction ratio meet the compression amount required by the maximum Mach number under the low-speed mode.

(2) When the flight Mach number is M∞>Mt, the motor 8-1 continuously drives the driving block 8-4 to slide leftwards, at the moment, the roller 6-4 rolls along the descending section of the track 8-6, the height of the roller is rapidly descended, and meanwhile, the roller 7-9 is also continuously lifted. When the roller 6-4 descends to the lowest point, the sharp point of the flow distribution plate 4 is in contact with the inner side of the flexible alloy material diffusion section 7-3, at the moment, the low-speed channel 2 is completely closed, the high-speed channel 1 is completely opened, and the mode conversion is completed, as shown in FIG. 2.

(3) When the flight Mach number is Mt<M∞<6, the inlet works under the high-speed mode. The motor 8-1 continuously drives the driving block 8-4 to slide leftwards, at the moment, the roller 7-9 and the roller 6-4 roll along the ascending sections of the track 8-5 and the track 8-6, respectively, the integrated surface 7-2 rotates around the hinge in the counterclockwise direction, and the flexible alloy material diffusion section 7-3 and the sharp point of the flow distribution plate 4 synchronously move upwards. At the moment, the total compression angle of external compression is continuously increased, the throat area is continuously reduced, and the internal contraction ratio is continuously increased, so that the compression performance of the inlet at high Mach number is ensured, and the mass flow coefficient of the inlet at high Mach number is improved. When M∞=6, the roller 7-9 and the roller 6-4 move to the rightmost limit positions of the track 8-5 and the track 8-6, and the guide block 7-5 moves to the leftmost limit position, as shown in FIG. 3. At the moment, the total compression angle of external compression is the largest, the throat area is the smallest, the internal contraction ratio is maximum, the inlet is in the shock-on-lip condition, and the mass flow coefficient is maximum.

Many methods and ways can be used for implementing the technical scheme of the present disclosure, and the above description is only a preferred embodiment of the present disclosure. It should be noted that, for those skilled in the art, a plurality of improvements and modifications can be made without departing from the principles of the present disclosure, and shall fall within the protection scope of the present disclosure. All unspecified components in the present example can be implemented by using existing technologies.

What is claimed is:

1. An internal-parallel inlet with mode conversion combined with variable geometry adjustment, comprising a high-speed channel extending from front to back, a low-speed channel positioned at an inner side of the high-speed channel and extending from front to back in parallel with the high-speed channel, a forebody compression surface, and a flow distribution plate of the high-speed/low-speed channel positioned between the high-speed channel and the low-speed channel; wherein the flow distribution plate comprises a fixed plate and a movable plate hinged to a front end of the fixed plate, and the movable plate swings inwards or outwards from a hinged position of the movable plate with the fixed plate; an outer wall surface of the high-speed channel is a high-speed channel cowl; an inner wall surface of the low-speed channel comprises a lower integrated surface hinged to a rear end of the forebody compression surface and a flexible diffusion section connected with a rear end of the lower integrated surface and extending backwards; a base is arranged on the inner sides of the forebody compression surface, the lower integrated surface and the flexible diffusion section; the base is provided with a driving device, a driving block connected with the driving device and a sliding rail bearing the driving block, and the driving block moves back and forth along the sliding rail under the driving of the driving device; a first driving rod positioned between an inner side of the lower integrated surface and the driving block and a second driving rod positioned between an inner side of the movable plate and the driving block are also arranged; a first guide groove and a second guide groove positioned behind the first guide groove are formed inside the driving block; the first guide groove comprises a first front end, a first middle position and a first rear end, the first front end is lower than the first middle position and the first rear end, the first middle position is lower than the first rear end, the second guide groove comprises a second front end, a second middle position and a second rear end, the second front end is higher than the second middle position and the second rear end, and the second rear end is higher than the second middle position;

one end of the first driving rod is fixed with the lower integrated surface, while a lower end of the first driving rod is hinged with the first guide groove through a first transverse shaft positioned in the first guide groove, and one end of the second driving rod is hinged with the movable plate, while a lower end of the second driving rod is hinged with the second guide groove through a second transverse shaft positioned in the second guide groove;

when one end of the first driving rod is positioned at the first front end, one end of the second driving rod is positioned at the second front end, and a front end of the movable plate abuts against an inner side of the high-speed channel cowl;

when the driving block moves forwards until one end of the first driving rod is positioned at the first middle position, one end of the second driving rod is positioned at the second middle position, the lower integrated surface is close to the high-speed channel cowl, and the front end of the movable plate abuts against an outer side of the flexible diffusion section;

when the driving block moves forwards until one end of the first driving rod is positioned at the first rear end, one end of the second driving rod is positioned at the second rear end, and the front end of the movable plate abuts against the outer side of the flexible diffusion section.

2. The internal-parallel inlet according to claim 1, wherein the second front end of the second guide groove extends from front to back for a certain distance, and when one end of the second driving rod slides within the distance of the second front end, the front end of the movable plate always abuts against the inner side of the high-speed channel cowl.

3. The internal-parallel inlet according to claim 2, wherein a rear end of the base is provided with a guide rail, a rear end of the flexible diffusion section is provided with a guide block matched with the guide rail, and the guide block slides back and forth on the guide rail.

4. The internal-parallel inlet according to claim 3, wherein the second driving rod passes through the flexible diffusion section and is transversally positioned under the constraint of the flexible diffusion section.

5. The internal-parallel inlet according to claim 3, wherein a bottom of the driving block is provided with a plurality of sliding blocks matched with the sliding rail.

6. The internal-parallel inlet according to claim 3, wherein a first pulley rolling along the first guide groove is arranged in the first guide groove, and one end of the first driving rod is hinged with the first pulley; a second pulley rolling along the second guide groove is arranged in the second guide groove, and one end of the second driving rod is hinged with the second pulley.

7. The internal-parallel inlet according to claim 2, wherein the second driving rod passes through the flexible diffusion section and is transversally positioned under the constraint of the flexible diffusion section.

8. The internal-parallel inlet according to claim 2, wherein a bottom of the driving block is provided with a plurality of sliding blocks matched with the sliding rail.

9. The internal-parallel inlet according to claim 2, wherein a first pulley rolling along the first guide groove is arranged in the first guide groove, and one end of the first driving rod is hinged with the first pulley; a second pulley rolling along the second guide groove is arranged in the second guide groove, and one end of the second driving rod is hinged with the second pulley.

10. The internal-parallel inlet according to claim 1, wherein the second driving rod passes through the flexible diffusion section and is transversally positioned under the constraint of the flexible diffusion section.

11. The internal-parallel inlet according to claim 1, wherein a bottom of the driving block is provided with a plurality of sliding blocks matched with the sliding rail.

12. The internal-parallel inlet according to claim 11, wherein a front end of the lower integrated surface is positioned in front of the high-speed channel cowl and is connected with the forebody compression surface, the lower integrated surface comprising a secondary external compression surface, an internal pressure section and a throat section sequentially extending from front to back.

13. The internal-parallel inlet according to claim 1, wherein a first pulley rolling along the first guide groove is arranged in the first guide groove, and one end of the first driving rod is hinged with the first pulley; a second pulley rolling along the second guide groove is arranged in the second guide groove, and one end of the second driving rod is hinged with the second pulley.

14. A method for controlling the internal-parallel inlet according to claim 1, comprising:

a working Mach number of the inlet is in a range of 0-6, and a Mach number of mode conversion is Mt ($2.5<Mt<3$); a working Mach number under a low-speed mode is in a range of 0-Mt, a working Mach number under a high-speed mode is in a range of Mt-6, and a Mach number of variable geometry adjustment under the low-speed mode is in a range of M1-Mt ($1.5<M1<2.5$); the specific working steps are as follows:

(1) when a flight Mach number is $0<M\infty<Mt$, one end of the first driving rod is positioned at the first front end, one end of the second driving rod is positioned at the second front end, and the front end of the movable plate abuts against the inner side of the high-speed channel cowl; at the moment, the high-speed channel is completely closed, the low-speed channel is opened, the throat area is the largest, and the internal contraction ratio is minimum; when $M1<M\infty<Mt$, the driving device drives the driving block to slide forwards, the front end of the movable plate abuts against the inner side of the high-speed channel cowl, and the flexible alloy material diffusion section moves towards the movable plate; at the moment, the high-speed channel is still completely closed, the low-speed channel is still opened, the total compression angle of external compression is continuously increased, the throat area is continuously reduced, and the internal contraction ratio is continuously increased until $M\infty=Mt$; at the moment, the total compression angle of external compression, the throat area and the internal contraction ratio meet the compression amount required by the maximum Mach number under the low-speed mode;

(2) when the flight Mach number is $M\infty>Mt$, the driving device drives the driving block to continuously slide forwards until one end of the first driving rod is positioned at the first middle position, one end of the second driving rod is positioned at the second middle position, and the front end of the movable plate is in contact with the flexible alloy material diffusion section; at the moment, the low-speed channel is completely closed, the high-speed channel is completely opened, and mode conversion is completed;

(3) when the flight Mach number is $Mt<M\infty<6$, the inlet works under the high-speed mode; the driving device drives the driving block to continuously slide forwards, one end of the first driving rod is positioned at the first rear end, one end of the second driving rod is positioned at the second rear end, the front end of the movable plate is in contact with the flexible alloy material diffusion section, the flexible alloy material diffusion section moves towards the high-speed channel cowl, at the moment, the total compression angle of external compression is continuously increased, the throat area is continuously reduced, and the internal contraction ratio is continuously increased, so that the compression performance of the inlet at high Mach number is ensured, and the mass flow coefficient of the inlet at high Mach number is improved; when $M\infty=6$, the flexible alloy material diffusion section moves to a limit position close to the high-speed channel cowl, at the moment, the total compression angle of external compression is the largest, the throat area is the smallest, the internal contraction ratio is maximum, the inlet is in the shock-on-lip condition, and the mass flow coefficient is maximum.

* * * * *